United States Patent
Corn et al.

(10) Patent No.: US 8,828,098 B2
(45) Date of Patent: Sep. 9, 2014

(54) EXTENDERS FOR FLUOROCHEMICAL TREATMENT OF FIBROUS SUBSTRATES

(75) Inventors: Stewart H. Corn, St. Paul, MN (US); Chetan P. Jariwala, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 672 days.

(21) Appl. No.: 11/959,017

(22) Filed: Dec. 18, 2007

(65) Prior Publication Data

US 2008/0146750 A1   Jun. 19, 2008

Related U.S. Application Data

(60) Provisional application No. 60/870,438, filed on Dec. 18, 2006.

(51) Int. Cl.
*D06M 13/395* (2006.01)
*D06M 13/398* (2006.01)
*C08G 18/30* (2006.01)

(52) U.S. Cl.
USPC ............. 8/192; 8/115.51; 8/115.6; 8/115.64; 8/115.67; 525/124; 528/45; 528/49; 560/24; 560/25; 560/26; 560/115; 560/157; 560/158

(58) Field of Classification Search
USPC ........ 528/45, 85, 49; 525/124, 199; 8/115.51, 8/115.6, 115.64, 115.67, 192; 560/24, 560/25, 115, 157, 158, 26
See application file for complete search history.

(56) References Cited

U.S. PATENT DOCUMENTS

| | | | |
|---|---|---|---|
| 4,834,764 A | 5/1989 | Deiner et al. | |
| 5,324,763 A | 6/1994 | Rössler et al. | |
| 5,508,370 A | 4/1996 | Reiff et al. | |
| 6,080,830 A | 6/2000 | Dirschl et al. | |
| 6,162,889 A * | 12/2000 | Orikabe et al. | 528/75 |
| 6,437,077 B1 | 8/2002 | Danner | |
| 6,890,360 B2 | 5/2005 | Coté et al. | |
| 2003/0136938 A1* | 7/2003 | Clark et al. | 252/8.62 |
| 2003/0149218 A1 | 8/2003 | Cotéet al. | |
| 2004/0077237 A1 | 4/2004 | Audenaert et al. | |
| 2004/0077238 A1 | 4/2004 | Audenaert et al. | |
| 2004/0124396 A1 | 7/2004 | Flynn et al. | |

FOREIGN PATENT DOCUMENTS

| | | | |
|---|---|---|---|
| JP | 1-104674 | * | 4/1989 |
| WO | 99/14422 | | 3/1999 |
| WO | 2006/071567 | | 7/2006 |

OTHER PUBLICATIONS

Unilin Alcohols; Baker Hughes; www.bakerhughes.com/polymers; 2011.*
Unithox Ethoxylates; Baker Hughes; www.bakerhughes.com/polymers. 2011.*
Blocked isocyanates III.: Part. A, Mechanisms and chemistry by Douglas Wicks and Zeno W. Wicks Jr., Progress in Organic Coatings, 36 (1999), pp. 14-172.
American Association of Textile Chemists and Colorists (AATCC) technical manual (2006), entitled "Oil Repellency: Hydrocarbon Resistance Test," TM-118-2002, pp. 189-191.
American Association of Textile Chemists and Colorists (AATCC) technical manual (2006), entitled "Aqueous Liquid Repellency: Water/Alcohol Solution Resistance Test," TM-193-2004, pp. 376-378.

* cited by examiner

*Primary Examiner* — Rabon Sergent
(74) *Attorney, Agent, or Firm* — Robert W. Sprague

(57) ABSTRACT

Non-fluorinated blocked polyurethanes are described as extenders and, particularly as textile auxiliaries, for use with fluorochemical polymers in treating substrates, for example fibrous substrates, such as textile fabrics or yarns. The polyurethane is prepared by reacting a polyisocyanate, a blocking agent, and a non-fluorinated isocyanate reactive compound having an average alkyl chain length of 24 to 50 carbon atoms.

14 Claims, No Drawings

EXTENDERS FOR FLUOROCHEMICAL TREATMENT OF FIBROUS SUBSTRATES

CROSS-REFERENCE TO RELATED APPLICATION

This application claims the benefit of Provisional Application No. 60/870,438, filed Dec. 18, 2006.

FIELD OF THE INVENTION

The present invention relates to non-fluorinated blocked isocyanate auxiliaries having low cost and improved storage stability for use in fluorochemical treatment of substrates, e.g., textile yarns. The treated substrates exhibit soft hand and good retention of physical properties such as color and tear strength.

BACKGROUND OF THE INVENTION

Treatments with fluorochemical compositions are known to confer hydrophobicity and oleophobicity to substrates, particularly fibrous substrates, e.g. textile yarns. Hydrophobic, oleophobic textile yarns exhibit improved stain repellency and improved stain release. Fluorochemical treatments are relatively expensive and are often used in combination with less expensive non-fluorinated "extenders". Among known extenders, blocked isocyanates are a desirable class since they are inexpensive, easy to prepare, and very effective. Blocked isocyanate extenders are typically delivered as emulsions in water. Unfortunately, such emulsions often exhibit poor stability on storage and detrimentally affect fabric softness, tear strength, and color.

There is a need to find improved blocked isocyanate extenders.

SUMMARY OF THE INVENTION

The present invention provides a blocked isocyanate extender comprising a blocked aromatic polyurethane, which confers excellent emulsion storage stability, performance, retention of fabric color, fabric tear strength, and fabric softness, when combined with fluorochemical compositions for treatment of textile fabrics or yarns.

Accordingly the present invention in one embodiment is a non-fluorinated blocked isocyanate composition comprising the reaction product of at least one polyisocyanate, at least one blocking agent, and at least one non-fluorinated isocyanate reactive compound having an average alkyl chain length of 24 to 50 carbon atoms.

In one embodiment, the blocked aromatic polyisocyanate extender of the present invention is prepared from the reaction of an aromatic di- or triisocyanate, an alkanone oxime blocking agent, and a monofunctional alcohol having an average alkyl chain length of 24 to 50 carbon atoms.

In another embodiment, the present invention provides a treatment composition in the form of a solution or dispersion (emulsion) containing the non-fluorinated blocked isocyanate extender as above-defined with a fluorochemical composition containing a perfluoroalkyl-containing polymer.

In still another embodiment of the invention, there is provided an article, e.g., textile fabric or yarn or other fibrous substrate, having a cured coating from the above emulsion containing the fluorochemical composition and the non-fluorinated blocked isocyanate extender.

The invention further provides a method of treating a substrate, such as a fibrous substrate including a textile fiber or yarn by applying an emulsion of the above fluorochemical composition and extender, and allowing the resulting coating to cure.

DETAILED DESCRIPTION OF ILLUSTRATIVE EMBODIMENTS

The blocked polyisocyanate extender of the present invention is prepared by reacting a) at least one polyisocyanate with b) at least one non-fluorinated isocyanate reactive compound having an average alkyl chain length of 24 to 50 carbon atoms and c) at least one blocking agent.

In one embodiment, the blocked aromatic polyisocyanate extender of the present invention is prepared from the reaction of an aromatic di- or triisocyanate, a monofunctional alcohol having an alkyl chain length of 24 to 50 carbon atoms, and an alkanone oxime blocking agent.

The polyisocyanate component may be aromatic or aliphatic to achieve improved and/or sustained stain release, oil repellency, and/or water repellency in accordance with the invention. Aromatic polyisocyanates are preferred in the present invention because they are typically relatively economical.

Examples of polyisocyanates for preparing the blocked polyisocyanates extenders include aromatic as well as aliphatic polyisocyanates. Suitable polyisocyanates for the preparation of the blocked polyisocyanate extenders preferably are di- or triisocyanates as well as mixtures thereof. Specific examples are aromatic diisocyanates such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate and aromatic tri-isocyanates such as polymethylenepolyphenylisocyanate.

Still further isocyanates that can be used for preparing a blocked isocyanate include alicyclic diisocyanates such as 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; aliphatic triisocyanates such as 1,3,6-hexamethylenetriisocyanate; aromatic tri-isocyanates such as polymethylenepolyphenylisocyanate (PAPI); cyclic diisocyanates such as isophorone diisocyanate (IPDI) and dicyclohexylmethane-4,4'-diisocyanate. Also useful are isocyanates containing internal isocyanate-derived moieties such as biuret-containing tri-isocyanates such as that available from Bayer as DESMODUR™ N-100, isocyanurate-containing tri-isocyanates such as that available from Huls AG, Germany, as IPDI-1890, and azetedinedione-containing diisocyanates such as that available from Bayer as DESMODUR™ TT. Also, other di- or tri-isocyanates such as those available from Bayer as DESMODUR™ L and DESMODUR™ W, and tri-(4-isocyanatophenyl)-methane (available from Bayer as DESMODUR™ R) and DDI 1410 from Henkel are suitable. Commercially available blocked aromatic polyisocyanates include Baygard™ EDW available from Bayer Corp. and HYDROPHOBOL™ XAN available from Huntsman Corporation of Salt Lake City, Utah, formerly from Ciba Specialty Chemicals. Further examples of blocked isocyanate compounds that may be used in the fluorochemical composition of this invention are disclosed in PCT Application No. WO 99/14422.

Suitable aromatic polyfunctional isocyanate compounds preferably are diisocyanates or triisocyanates as well as mixtures thereof. Illustrative examples include, but are not limited to, those selected from the group consisting of 2,4-toluene diisocyanate (TDI), 2,6 toluene diisocyanate, an adduct of TDI with trimethylolpropane (available as DESMODUR™ CB from Bayer Corporation, Pittsburgh, Pa.), the isocyanurate trimer of TDI (available as DESMODUR™ IL from Bayer Corporation), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methoxy-2,4-phenylene diisocyanate, 1-chlorophenyl-2,4-diisocyanate, and isocyanates comprising methylene-arylene structures (PAPI).

Aliphatic polyisocyanates may optionally be included. Suitable aliphatic polyisocyanates include diisocyanates, triisocyanates and mixtures thereof. Illustrative examples include hexamethylenediisocyanate, 2,2,4-trimethyl-1,6-hexamethylenediisocyanate, and 1,2-ethylenediisocyanate, dicyclohexylmethane-4,4'-diisocyanate, aliphatic triisocyanates such as 1,3,6-hexamethylenetriisocyanate, cyclic trimer of hexamethylenediisocyanate and cyclic trimer of isophorone diisocyanate (isocyanurates). Other examples of aliphatic polyisocyanates include, but are not limited to, those selected from the group consisting of 1,4-tetramethylene diisocyanate, hexamethylene 1,4-diisocyanate, hexamethylene, 1,6-diisocyanate (HDI), 1,12-dodecane diisocyanate, 2,2,4-trimethyl-hexamethylene diisocyanate (TMDI), 2,4,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (available as DESMODUR™ N-100 and N-3200 from Bayer Corporation), the isocyanurate of HDI (available as DESMODUR™ N-3300 and DESMODUR™ N-3600 from Bayer Corporation), a blend of the isocyanurate of HDI and the uretdione of HDI (available as DESMODUR™ N3400 available from Bayer Corporation), and mixtures thereof.

Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperatures the blocking group will be released from the blocked polyisocyanate group thereby generating the isocyanate group again which can then react with an isocyanate reactive group, such as may be found on the surface of a fibrous substrate. Blocking agents and their mechanisms have been described in detail in "Blocked isocyanates III: Part. A, Mechanisms and chemistry" by Douglas Wicks and Zeno W. Wicks Jr., Progress in Organic Coatings, 36 (1999), pp. 14-172. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles. One or more blocking agents may be used.

In one embodiment of the present invention the non-fluorinated isocyanate reactive compound is a mono- or multifunctional alcohol having an average alkyl chain length of at least 24 carbon atoms. Compared with conventional commercially available alcohol materials that has been limited to carbon chain lengths of $C_{22}$ or below, UNILIN™ Alcohols from Baker Petrolite are available with average chain lengths of $C_{24}$ to $C_{50}$. Melt points of UNILIN™ Alcohols products range from about 78° C. to about 106° C. UNILIN™ Alcohols are composed of approximately 80% primary alcohol; the remaining 20 percent is saturated or chemically inactive hydrocarbons of the same molecular weight. The hydroxyl function of the alcohol is evenly distributed among all carbon chain lengths. Examples include, but are not limited to, alcohols of polyolefins such as polyethylene, polypropylene, poly (alpha-olefin) and combinations thereof; and block copolymers of polyoxyalkylenes such as poly(ethylene oxide) with the aforementioned alcohols. Suitable monofunctional alcohols include long chain primary alcohols having alkyl chain lengths of 24 to 50 carbon atoms. Commercially available examples include materials sold under the trade name UNILIN available from Baker Petrolite. Suitable block copolymers of poly(ethylene oxide) and UNILIN type alcohols include the UNITHOX™ alcohol ethoxylates also available from Baker Petrolite. These commercial materials are believed to contain amounts of relatively low molecular weight polyethylene groups. By reacting ethylene oxide with UNILIN™ Alcohols, Baker Petrolite produces the UNITHOX™ Ethoxylate series of high molecular weight, high melting point, non-ionic surfactants.

Optionally, other non-fluorinated compounds having one or more isocyanate reactive groups could be used to replace a portion of the alkyl groups or the blocking groups. Such compounds are known in the art and include, but are not limited to, those having isocyanate reactive groups such as hydroxy, amino, epoxy, or thiol groups.

The blocked polyisocyanate is produced by reacting from about 1 to about 99 percent of the isocyanate groups with the blocking agent, preferably from about 15 to about 85 percent, and most preferably from about 40 to about 70 percent. From about 1 to about 99 percent of the isocyanate groups are reacted with the alcohol, preferably from about 15 to about 85 percent, and most preferably from about 30 to about 60 percent.

The blocked aromatic polyurethane is prepared by reacting the aromatic polyisocyanate with the other components in the presence of a catalyst such as an organic tin compound and under reaction conditions commonly employed and known in the art. Suitable catalysts include, but are not limited to, tin II and tin IV salts such as stannous octanoate, dibutyltin dilaurate, dibutyltin diacetate, dibutyltin di-2-ethylhexanoate, and dibutyltinoxide. Examples of useful tertiary amine compounds include triethylamine, tributylamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co.). Tin compounds are preferred.

The above defined extender or auxiliary of the present invention is combined with a perfluoroalkyl-containing polymer for treating a substrate, particularly, a fibrous substrate. The perfluoroalkyl polymers, for example, are described in U.S. Pat. Nos. 4,834,764, 5,324,763, 6,437,077, and 6,890,360 among others. These patents are incorporated herein by reference in their entirety. One embodiment includes perfluoropolyurethanes where the perfluoroalkyl group, $R^f$, has from 2 to 12 carbon atoms, preferably from 3 to 6 carbon atoms, and more preferably 4 carbons. Perfluoroalkyl polymers having 3 to 6 carbon atoms are known to have better environmental properties.

Also contemplated as fluorochemical urethanes to be combined with the extenders of the present invention are perfluoropolyethers as described in US Patent Publication Nos. 2004/0077237 and 2004/0077238. These U.S. patent publications are incorporated herein by reference in their entirety. Also, there are indications that fluorinated polyether compounds having a fluorinated polyether moiety derivable from hexafluoropropylene oxide and having a molecular weight of at least about 750 g/mole would more effectively eliminate from the body of living organisms as compared to long chain perfluoroaliphatic compounds (US Patent Publication No. 2004/0124396).

The composition for treating substrates, i.e. the treatment composition, comprises a perfluoralkyl-containing polymer and the extender/auxiliary compound of the present invention and in a weight ratio of about 12:1 to about 1:12, preferably from about 1.5:1 to about 6:1. In one embodiment the perfluoralkyl-containing polymer is a fluorochemical urethane.

The treatment composition for fibrous substrates comprises the chemical compositions of the present invention and at least one solvent. When applied to fibrous substrates, the treatment compositions impart stain-release characteristics and exhibit durability (i.e., they resist being worn off) when exposed to wear and abrasion from use, cleaning, and the elements.

The chemical compositions of the present invention can be dissolved or dispersed in a variety of solvents to form coating compositions suitable for use in coating the chemical compositions of the present invention onto a substrate. Fibrous substrate treatment compositions may contain from about 0.1 to about 50 weight percent chemical composition. Preferably the chemical composition is used in the coating composition at about 0.1 to about 10 weight percent, most preferably from about 0.2 to about 1 weight percent.

Suitable solvents include water, alcohols, esters, glycol ethers, amides, ketones, hydrocarbons, chlorohydrocarbons, chlorocarbons, and mixtures thereof. Depending upon the substrate to which the composition is being applied, water is the preferred solvent because it does not raise any environmental concerns and is accepted as safe and non-toxic.

The treatment compositions of the present invention can be applied to a wide variety of fibrous substrates resulting in an article that displays durable stain-release properties. The articles of the present invention comprise a fibrous substrate having a treatment derived from at least one solvent and a chemical composition of the present invention. After application and curing of the coating composition, the substrate displays durable stain release properties.

The treatment compositions of the present invention can be applied to a wide variety of fibrous substrates including woven, knit, and nonwoven fabrics, textiles, carpets, leather, and paper. Substrates having nucleophilic groups, such as cotton are preferred because they can bond to the isocyanate groups of the chemical compositions of the present invention, thereby increasing durability of the fiber treatment. Any application method known to one skilled in the art can be used including spraying, dipping immersion, foaming, atomizing, aerosolizing, misting, flood coating, and the like.

To impart release/repellency/resistance characteristics to a fibrous substrate, the coating composition of the present invention is applied to the substrate and is allowed to cure (i.e., dry), at ambient or elevated temperature. Preferably the applied composition is heated to improve adherence to the substrate resulting in enhanced durability.

In order to affect treatment of the fibrous substrate the fibrous substrate is contacted with the blocked isocyanate extender of the invention, preferably in combination with a fluorochemical composition. For example, the substrate can be immersed in the treatment composition. The treated substrate can then be run through a padder/roller to remove excess fluorochemical composition and dried or cured. The treated substrate may be dried at ambient temperature or may alternatively or additionally be subjected to a heat treatment, for example, in an oven. A heat treatment is typically carried out at temperatures from about 50° C. to about 190° C. depending on the particular system or application method used. In general, a temperature of about 120° C. to 180° C., in particular of about 150° C. to about 180° C. for period of about 20 seconds to about 10 minutes, preferably about 3 to about 5 minutes, is suitable. Alternatively, the chemical composition can be applied by spraying the composition on the fibrous substrate. An ambient cure preferably takes place at about 15° C. to about 35° C. (i.e. ambient temperature) until dryness is achieved, up to approximately 24 hours. With either heat-treatment or ambient cure, the chemical composition can also form chemical bonds with the substrate and between molecules of the chemical composition.

The choice of either heat treatment or ambient cure often depends on the desired end-use. For consumer applications, where the composition may be applied to household laundry or carpeting, and ambient cure is desired. For industrial applications, where the fibrous substrate, such as a textile might normally be exposed to elevated temperatures during production, elevated temperature cure or heating-treatment may be desirable. The blocked isocyanate extenders of the invention are preferably cured by heat treatment.

The amount of the treating composition applied to the fibrous substrate is chosen so that a sufficiently high level of the desired properties are imparted to the substrate surface without substantially affecting the look and feel of the treated substrate. Such amount is usually such that the resulting amount of the blocked isocyanate on the treated fibrous substrate will be from about 0.01 percent to about 1.7 percent by weight based on the weight of the fibrous substrate and the fluorochemical urethane composition on the treated fibrous substrate will be from about 0.05 percent to about 5 percent by weight based on the weight of the fibrous substrate, known as solids-on-fiber (referred to herein as "SOF"). The amount that is sufficient to impart desired properties can be determined empirically and can be increased as necessary or desired.

Fibrous substrates that can be treated with the treatment composition include in particular textiles. The fibrous substrate may be based on synthetic fibers, e.g., polyester, polyamide and polyacrylate fibers or natural fibers, e.g., silk, wool, or cellulose fibers as well as mixtures thereof. The fibrous substrate may be a woven as well as non-woven substrate. Preferred substrates are cellulosic materials such as cotton, rayon, TENCEL™ and blends of cellulosic materials.

The resulting treated substrates, derived from at least one solvent and a chemical composition of the present invention, have been found to resist soils and/or stains and/or to release soils and/or stains with simple washing methods. The cured treatments have also been found to be durable and hence to resist being worn off due to wear and abrasion from use, cleaning, and the elements.

The invention will now be further illustrated with reference to the following examples without the intention to limit the invention thereto. All parts and percentages are by weight unless stated otherwise.

EXAMPLES

Test Methods

Oil Repellency Test:
This test measures the resistance of treated fabric to oil-based insults. A drop of one standard surface tension fluid (of a series of 8, with decreasing surface tensions) is dropped on a treated fabric. If after thirty seconds there is no wetting, the next highest standard number fluid (next lowest surface tension) is tested. When the lowest number fluid soaks into the fabric, the next lower number is the rating. For example, the fabric will receive a three rating, if the number four fluid wets the fabric. A more detailed description of the test is written in the American Association of Textile Chemists and Colorists (AATCC) technical manual (2006), TM-118-2002.

Water Repellency Test:

This test measures the resistance of treated fabric to water based challenges. A drop of one standard surface tension fluid (of a series of 8, with decreasing surface tensions, based on water and water/isopropyl alcohol mixtures where 100 percent water is a 0 rating, and a mixture of 40 percent water, 60 percent IPA is an 8 rating) is placed on a treated fabric to form a bead. If after thirty seconds there is no wetting, the next highest standard number fluid (next lowest surface tension) is tested. When the lowest number fluid soaks into the fabric, the next lower number is the rating. For example, the fabric will receive a three rating, if the number four fluid wets the fabric. A more detailed description of the test is written in AATCC TM-193-2004.

Stain Release Test:

This test evaluates the release of forced in stains from the treated fabric surface during simulated home laundering, and is similar to AATCC TM-130-2000, with modifications described as follows. Five drops of KAYDOL™ white mineral oil (available Sonneborn, Inc., Tarrytown, N.Y.) and five drops of MAZOL™ corn oil (available from ACH Food Companies, Inc.) are dropped onto the fabric surface in separate puddles. The puddles are covered with glassine paper, and weighted with a 0.25 pound weight each for 60 seconds. The weights and glassine paper are removed from the fabric. The fabric sample is hung for 60 minutes, and then washed, dried, and evaluated against a rating board, and assigned a number rating from one to five. A five rating represents total removal of the stain, whereas a one rating is a very dark stain.

Color Measurement Test Procedure:

Color change in treated fabric was evaluated by measuring the color in L*a*b* color space with a Chroma Meter CR310 color analyzer (from Konica Minolta Sensing Americas, Inc.) and calculating delta E ($\Delta E$) as the difference from a reference substrate (such as untreated fabric) per the equation $\Delta E = (\Delta L^{*2} + \Delta a^{*2} + \Delta b^{*2})^{0.5}$. Color change on treated fabric was tested after the pad-dry-cure process described previously. Color change was optionally measured after the bleaching procedure described below. Greater color change was indicated by a larger value for $\Delta E$ (unitless).

Bleaching Procedure:

Bleaching was performed on white 100 percent cotton fabrics according to the following procedure. 60 g of commercial bleach solution (6 percent sodium hypochlorite, Target Corp.) was diluted to 1500 ml with tap water in a plastic container. The fabrics to be bleached were placed in the container and agitated by hand to fully wet the fabrics, then soaked for 15 minutes. The dilute bleach was then emptied from the container. The fabric samples were then triple rinsed with tap water, excess liquid was squeezed by hand, and the fabric samples were placed in a tumble dryer on high setting for approximately 30 minutes. The fabrics were then removed from the dryer, smoothed of wrinkles, and allowed to cool. Color measurement was performed on the samples within 24 hours.

Tear Strength Test Procedure:

Tear strength tests were performed on 100 percent cotton woven fabrics according to the following procedure. After the pad/dry/cure process, five rectangular samples 10 cm×6.3 cm (4 in.×2.5 in) for cross directional and machine directional tears were prepared. The samples were allowed to equilibrate in a room with controlled humidity (50 percent) and temperature (21° C., 70° F.) for 4 hours or more. The samples were tested using a Digital Elmendorf Tearing Tester (SDL Atlas, Stockport, United Kingdom) and the results recorded in Newtons (N). A more complete description of this test is written in ASTM D-1424.

Durability Procedure:

The Oil Repellency, Water Repellency, and Stain Release Tests were run on treated fabric that had been washed (for example, 5 or 20 consecutive launderings) followed by tumble drying, as described below. The treated samples were placed in a washing machine along with untreated ballast fabric (1.9 kg of bleached cotton fabric in the form of generally square, hemmed 8100 cm$^2$ sheets). A commercial detergent (TIDE™ liquid, available from Procter and Gamble, 75 g) was added and the washer was filled to high water level with hot water (41° C.+/−2° C.). The substrate and ballast load were washed 5 or 20 times using a 12 minute normal wash cycle. The substrate and ballast were dried together in a conventional tumble drier at 65+/−5° C. for up to 45 minutes. Before testing, the substrates were conditioned at room temperature for about 4 hours.

Fabric Softness Test Procedure:

Samples for the fabric softness tests were prepared by first treating the fabric samples by the pad/dry/cure process. The samples were placed in a tumble dryer with approximately 0.6 kg ballast fabric (as described in the above Durability Test Procedure) that had been dampened with approximately 0.2 kg tap water, tumble-dried for 20 minutes, then allowed equilibrate with room temperature and humidity. Five evaluators separately evaluated the fabric softness using the method of paired comparisons, whereby a sample is given a rating of 1 if it is softer, 0 if it is harsher, or 0.5 if it is equal to the fabric sample it is paired with. Ratings for each treatment were totaled and averaged for all raters. A relatively softer treatment was indicated by a higher score.

Example 1

Blocked Aromatic Polyurethane (UNILIN™ 550/CB-75N/MEKO)

To a 3-necked flask equipped with a condenser was added 15.0 grams (0.0464 eq.) of DESMODUR™ CB-75N (an aromatic polyisocyanate adduct based on toluene diisocyanate (TDI) and dissolved in ethyl acetate, available from Bayer Corporation, Pittsburgh, Pa.), 13.4 grams (0.0179 eq.) of UNILIN™ 550 (a long chain primary alcohol, available from Baker Petrolite, Sugar Land, Tex.), and 75.0 grams of MIBK (methyl isobutyl ketone). The mixture was heated at 95° C. under nitrogen until visually clear. The temperature was reduced to 85° C. and 1 drop of dibutyltin dilaurate (available from Air Products, Allentown, Pa.) was added. After 2 hours at 85° C., 2.42 grams (0.0277 eq.) of MEKO (2-butanone oxime available from Tokyo Chemical Industry America, Portland, Oreg.) was added and the mixture heated for another 2 hours. Infrared analysis showed the absence of the —NCO peak.

Emulsification of the Blocked Aromatic Polyurethane

To 125.0 g of water 4 weight percent, based on solids of the above organic solution, of ARQUAD™ 2HT-75 surfactant (di(hydrogenated tallow)dimethylammonium chloride, available from Akzo Nobel, Chicago, Ill.) was added and the mixture was heated to 85° C. To this stirring solution was added the above organic solution (at 85° C.) and 3 weight percent based on solids of UNITHOX™480 surfactant (an ethoxylated alcohol, available from Baker Petrolite). The mixture was then sonicated for 4 minutes. The resulting emulsion was stripped of the organic solvent by vacuum distillation.

Heat stability testing was performed on the Example 1 emulsion. For comparison, a commercially available blocked aromatic isocyanate emulsion was also tested, HYDROPHOBOL™ XAN. Emulsion samples were enclosed in 1.5-drams vials and the vials were then placed in a 65° C. oven. The vials were removed from the oven after 3 weeks and the volume percent solidified material was visually estimated. The Example 1 emulsion had approximately 5 percent of sediment at the bottom of the vial while the HYDROPHOBOL™ XAN emulsion was nearly completely (95 percent) solidified.

Similarly, blocked isocyanates can be prepared from commercially available UNILIN™ 350, UNLIN™ 425, and UNILIN™ 700 by replacing an equimolar ratio of unilin550 in the procedure mentioned above.

Example 2

Blocked Aromatic Polyurethane (UNITHOX™ 450/CB-75N/MEKO)

To a 3-necked flask equipped with a condenser was added 15.0 g (0.0464 eq.) of DESMODUR™ CB-75N, 22.2 g (0.0185 eq.) of UNITHOX™ 450 (an ethoxylated alcohol, available from Baker Petrolite), and 75.0 g of MIBK. The mixture was heated at 95° C. under nitrogen until visually clear. The temperature was reduced to 85° C. and 1 drop of dibutyltin dilaurate was added. After 2 hours at 85° C., 2.42 g (0.0277 eq). of MEKO was added and the mixture heated for another 2 hours. Infrared analysis showed the absence of the —NCO peak.

The same procedure for emulsification was followed as described in Example 1.

Similarly, blocked isocyanates can be prepared from commercially available UNITHOX™ 350 ethoxylate, UNITHOX™ 380 ethoxylate, UNITHOX™ 420 ethoxylate, UNITHOX™ 480 ethoxylate, UNITHOX™ 490 ethoxylate, UNITHOX™ 520 ethoxylate, UNITHOX™ 550 ethoxylate, UNITHOX™ 720 ethoxylate, UNITHOX™ 750 ethoxylate by replacing an equimolar ratio of UNITHOX™ 450 ethoxylate in the procedure mentioned above.

Example 3

Blocked Aromatic Polyurethane (UNILIN™ 550/PP-30/CB-75N/MEKO)

To a 3-necked flask equipped with a condenser was added 15.0 g (0.0464 eq.) of DESMODUR™ CB-75N, 10.4 g (0.0139 eq.) of UNILIN™ 550, and 75.0 g of MIBK. The mixture was heated at 95° C. under nitrogen until visually clear. The temperature was reduced to 85° C. and 1 drop of dibutyltin dilaurate was added. After 2 hours at 85° C., 2.42 g (0.0277 eq.) of MEKO was added and the mixture heated for another 2 hours. To this was added 3.7 g (0.0045 eq.) of PP-30 (pentaerythritol ethoxylate available from Perstorp Corp., Perstorp, Sweden) and one drop of dibutyltin dilaurate. The mixture was heated for another 2 to 3 hours. Infrared analysis showed the absence of the —NCO peak.

The same procedure for emulsification was followed as in Example 1.

Comparative Example 1

Preparation of the Blocked Aromatic Polyurethane (Stearyl Alcohol/CB-75N/MEKO)

To a 3-necked flask equipped with a condenser was added 15.0 g (0.0464 eq.) of DESMODUR™ CB-75N, 5.0 g (0.0185 eq.) of stearyl alcohol (available from Aldrich Chemical Co.), and 75.0 g of MIBK. The mixture was heated at 95° C. under nitrogen until visually clear. The temperature was reduced to 85° C. and 1 drop of dibutyltin dilaurate was added. After 2 hours at 85° C., 2.42 grams (0.0277 eq.) of MEKO was added and the mixture heated for another 2 hours. Infrared analysis showed absence of the —NCO peak.

The same procedure for emulsification was followed as described in Example 1.

Formulation of Treatment Compositions 1-4 and Fabric Treatment Procedure (A)

A premix was prepared containing 119.0 g of 3M™ Protective Material PM-930 (fluorochemical emulsion available from 3M Company, St. Paul, Minn.), 3.0 g of WET-AID™ NRW (nonionic surfactant), 135.0 g of FREEREZ™ PFK (glyoxal based durable press resin), and 27.0 g of FREECAT™ MX (catalyst), all three available from Emerald Performance Materials, Charlotte, N.C.), and 1174.7 g of water.

Treatment Compositions 1 and 2 were prepared by diluting aliquots of the premix with water and then combining the premix with the Example 1 emulsion, as shown below in Table I. For comparison samples were also prepared by diluting aliquots of premix with HYDROPHOBOL™ XAN extender (Treatment Composition 3) or no extender (Treatment Composition 4). The Treatment Compositions used and imparted percent SOF for the extenders are indicated in Table 1.

TABLE I

| Treatment Composition | Premix [g] | Water [g] | Example 1 Emulsion [g (percent SOF)] | HYDROPHOBOL ™ XAN [g (percent SOF)] |
|---|---|---|---|---|
| 1 | 243.1 | 2.3 | 4.6 (0.3) | None |
| 2 | 243.1 | 0 | 6.9 (0.45) | None |
| 3 | 243.1 | 2.9 | None | 4.0 (0.3) |
| 4 | 243.1 | 6.9 | None | None |

The treatment compositions were applied to white cotton woven fabric (100 percent cotton style #400M from Testfabrics, Inc., West Pittston, Pa.) using known padding processes. The fabric was dipped into the bath with compositions described above and immediately sent through a set of rubber rollers to squeeze out the excess liquid. The fabric was dried for twenty minutes at 210° F. (99° C.) and then cured for 3 minutes at 320° F. (160° C.). The treated fabric samples were evaluated for tear strength in the machine direction (MD) and the cross direction (CD) and for color change according to the above test methods. For further comparison, samples of untreated, unheated fabric (Control) were also evaluated. Results are shown in the Table II.

TABLE II

| Treatment Composition | Color Change after pad/dry/cure [ΔE] | Color Change after bleach [ΔE] | Tear Strength MD (N) | Tear Strength CD (N) |
|---|---|---|---|---|
| 1 | 0.77 | 1.53 | 4.26 | 8.02 |
| 2 | 0.68 | 1.80 | 4.43 | 7.55 |
| 3 | 0.99 | 4.10 | 3.71 | 7.10 |
| 4 | 0.60 | 0.45 | 3.84 | 7.15 |
| Control Fabric (untreated/unheated) | 0 | 0 | 5.87 | 8.06 |

Formulation of Treatment Compositions 5-8 and Fabric Treatment Procedure (B)

A premix was made from 143.6 g 3M™ Protective Material PM-930, 126.6 g FREEREZ™ PFK, 25.3 g FREECAT™ MX, 4.2 g WET-AID™ NRW, and 1696.8 g of water.

Treatment Compositions 5-8 were prepared by diluting aliquots of the premix with water and then combining the premix with the Example 1 emulsion or HYDROPHOBOL™ XAN, and, optionally, a silicone softener. The silicone softener was prepared from 60 g of DOW CORNING™ Polymer 8813 (am amidofunctional silicone polymer from Dow Corning, Midland, Mich.), 14.4 g of TERGITOL™ 15-S-12, and 21.6 g of TERGITOL™ 15-S-5 (emulsifiers from Dow Chemical Co.), 1 g glacial acetic acid, and diluting with water and mixing per instructions from Dow Corning to make a clear emulsion with 22.6 percent solids. Compositions of the treatment compositions and imparted percent SOF for the extenders are shown in Table III.

TABLE III

| Treatment Composition | Premix [g] | Example 1 Emulsion [g (percent SOF)] | HYDROPHOBOL™ XAN [g (percent SOF)] | Softener [g (percent SOF)] | Water [g] |
|---|---|---|---|---|---|
| 5 | 283.9 | 7.1 (0.5) | None | None | 9.0 |
| 6 | 283.9 | 7.1 (0.5) | None | 9 (0.5) | None |
| 7 | 283.9 | None | 4.1 (0.3) | None | 12.0 |
| 8 | 283.9 | None | 4.1 (0.3) | 9 (0.5) | 3.0 |

The treatment compositions were applied to a white cotton knit fabric (100 percent cotton, open end, T-shirt knit, FRUIT OF THE LOOM™, Jamestown, Ky.) using known padding processes. The test samples were dried for twenty minutes at 210° F. (99° C.) and then cured for three minutes at 320° F. (160° C.). The fabric samples were tested for Oil Repellency (OR), Water Repellency (WR), and softness (hand) according to the above test methods. The durability of the fabric treatments was also evaluated by running oil repellency and water repellency tests after 5 and 20 launderings (5 L, 20 L). The results are shown in Table IV.

TABLE IV

| Treatment Composition | Hand | OR (initial) | WR (initial) | OR (5 L) | WR (5 L) | OR (20 L) | WR (20 L) |
|---|---|---|---|---|---|---|---|
| 5 | 3.2 | 5 | 3 | 5 | 3 | 5 | 2 |
| 6 | 4.2 | 3 | 3 | 3 | 3 | 2 | 1 |
| 7 | 1.2 | 5 | 3 | 5 | 3 | 4 | 0 |
| 8 | 2.5 | 3 | 3 | 3 | 3 | 3 | 0 |

Formulation of Treatment Compositions 9-12 and Fabric Treatment Procedure (C)

A premix was prepared containing 12.50 g of 3M™ Protective Material PM-490 (fluorochemical emulsion available from 3M Company), 24.9 g of PM-930, 2.1 g of WET-AID™ NRW, and 996.1 g water.

Treatment Compositions 9-12 were prepared by diluting aliquots of the premix with water and then combining the premix with Example 1 emulsion, Example 2 emulsion, Comparative Example 1 emulsion, and HYDROPHOBOL™ XAN extender, as shown in Table V. Each treatment imparted an equivalent amount of extender to the fabric (0.41 percent SOF).

TABLE V

| Treatment Composition | Extender Type | Premix (g) | Extender (g) | Water (g) |
|---|---|---|---|---|
| 9 | Example 1 emulsion | 146.6 | 3.2 | 0.3 |
| 10 | Example 2 emulsion | 146.6 | 2.8 | 0.6 |
| 11 | Comparative Example 1 emulsion | 146.6 | 3.5 | None |
| 12 | HYDROPHOBOL™ XAN | 146.6 | 2.7 | 0.8 |

The treatment compositions were applied to a khaki cotton knit fabric (100 percent cotton, open end, T-shirt knit, FRUIT OF THE LOOM™) using known padding processes. The test samples were dried for twenty minutes at 210° F. (99° C.) and then cured for three minutes at 320° F. (160° C.). The fabric samples were tested for Oil Repellency (OR), Water Repellency (WR), and stain release (SR). Test results are shown in Table VI.

TABLE VI

| Treatment Composition | OR | WR | SR (mineral oil) | SR (corn oil) |
|---|---|---|---|---|
| 9 | 5 | 4 | 2 | 3.5 |
| 10 | 5 | 4 | 4 | 4.5 |
| 11 | 5 | 4 | 1 | 1.5 |
| 12 | 5 | 4 | 2 | 3.5 |

The results show that although oil repellency and water repellency are similar for these treatments, stain release on the fabric treated with Treatment Composition 11 (prepared with Comparative Example 1 emulsion) was very poor.

Formulation of Treatment Compositions 13-15 and Fabric Treatment Procedure (D)

A premix was made from 119.8 g 3M™ Protective Material PM-930, 105.6 g FREEREZ™ PFK, 21.1 g FREECAT™ MX, 3.5 g WET-AID™ NRW, and 1458.6 g water.

Treatment Compositions 13-15 were prepared by diluting aliquots of the premix with water and then combining the premix with the Example 3 emulsion, HYDROPHOBOL™ XAN extender, or additional water, as shown in the Table VII.

TABLE VII

| Treatment Composition | Extender Type | Premix (g) | Extender (g) | Water (g) |
|---|---|---|---|---|
| 13 | Example 3 emulsion | 242.7 | 5.6 | 1.7 |
| 14 | HYDROPHOBOL™ XAN | 242.7 | 3.4 | 3.9 |
| 15 | None | 242.7 | None | 7.3 |

The treatment compositions were applied to a white cotton knit fabric (100 percent cotton, open end, T-shirt knit, FRUIT OF THE LOOM™) and a khaki woven fabric (British khaki twill, Avondale) using known padding processes. The average amount of emulsion imparted to these fabrics was 0.3 percent SOF for HYDROPHOBOL™ XAN and 0.45 percent SOF for the Example 3 emulsion. The test samples were dried for twenty minutes at 210° F. (99° C.) and then cured for three minutes at 320° F. (160° C.). The khaki fabric samples were tested for Oil Repellency (OR), Water Repellency (WR), and stain release (SR). The durability of the fabric treatments was also evaluated by testing OR, WR, and SR after 20 launderings (20 L). Test results are shown in Table VIII.

TABLE VIII

| Treatment Composition | OR | WR | SR (mineral oil) | SR (corn oil) | OR (20 L) | WR (20 L) | SR (20 L) (mineral oil) | SR (20 L) (mineral oil) |
|---|---|---|---|---|---|---|---|---|
| 13 | 5 | 4 | 4 | 4.5 | 5 | 2 | 4.5 | 4.5 |
| 14 | 5 | 4 | 5 | 5 | 5 | 2 | 5 | 5 |
| 15 | 5 | 4 | 5 | 5 | 4 | 0 | 4.5 | 4.5 |

The khaki fabric samples were also tested for tear strength in the machine direction (MD) and cross direction (CD), and the white fabric samples were tested for color change from unheated, untreated fabric. These test results are shown in Table IX.

TABLE IX

| Treatment Composition | MD Tear Strength on khaki fabric (N) | CD Tear Strength on khaki fabric (N) | ΔE on white fabric (ΔE from unheated, untreated fabric) |
|---|---|---|---|
| 13 | 1.45 | 1.91 | 1.74 |
| 14 | 1.27 | 1.73 | 2.71 |
| 15 | 1.21 | 1.71 | 1.16 |

The above specification, examples and data provide a complete description of the manufacture and use of the composition of the invention. Since many embodiments described above can be made without departing from the spirit and scope of the invention, the invention resides in the claims hereinafter appended.

What is claimed is:

1. A non-fluorinated blocked isocyanate extender composition comprising the reaction product of at least one polyisocyanate, at least one blocking agent, and at least one non-fluorinated isocyanate reactive compound having an average alkyl chain length of 31 to 50 carbon atoms; wherein the non-fluorinated isocyanate reactive compound is selected from an aliphatic monofunctional alcohol having a chain length of 31 to 50 carbon atoms, and a copolymer of poly (ethylene oxide) and an aliphatic monofunctional alcohol having a chain length of 31 to 50 carbon atoms; and wherein the blocking agent is selected from the group consisting of arylalcohols, lactams, oximes, bisulfite, triazoles, and combinations thereof.

2. The extender composition of claim 1 wherein the polyisocyanate is an aromatic polyisocyanate.

3. The extender composition of claim 1 wherein the alcohol is a polyolefin alcohol.

4. The extender composition of claim 1 wherein the polyisocyanate is a diisocyanate or a triisocyanate.

5. The extender composition of claim 4 wherein the blocking agent is an alkanone oxime.

6. The extender composition of claim 1 wherein the blocked polyisocyanate is produced by reacting from about 15 to about 85 percent of the isocyanate groups with the blocking agent.

7. The extender composition of claim 1 wherein from about 15 to about 85 percent of the isocyanate groups are reacted with said alcohol.

8. The extender composition of claim 1 further comprising an aliphatic polyisocyanate.

9. A treatment composition comprising a solution or dispersion of the extender composition of claim 1, a perfluoroalkyl-containing polymer, and a solvent.

10. The treatment composition of claim 9 wherein the solvent is selected from the group consisting of water, an organic solvent, and mixtures thereof.

11. An article comprising a substrate having a coating derived from drying a treatment composition of claim 9.

12. The article of claim 11 wherein the substrate is a fibrous substrate.

13. The article of claim 11 wherein the substrate is a textile yarn.

14. A method of imparting stain repellency and stain-release characteristics to a fibrous substrate comprising the steps of applying a treatment composition of claim 9, and allowing the coating composition to dry; wherein the treatment composition comprises perfluoroalkyl-containing polymer and extender composition in a weight ratio of about 12:1 to about 1:12 and wherein the resulting amount of the reaction product of the extender composition on the treated fibrous substrate is from about 0.01 percent to about 1.7 percent by weight based on the weight of the fibrous substrate.

* * * * *